United States Patent [19]
Gould

[11] Patent Number: 5,241,618
[45] Date of Patent: Aug. 31, 1993

[54] TERMINATION AND JOINT FOR OPTICAL TELECOMMUNICATIONS CABLE

[75] Inventor: Colin A. Gould, Ipswich, England
[73] Assignee: British Telecommunications public limited company, London, England
[21] Appl. No.: 730,829
[22] PCT Filed: Dec. 13, 1989
[86] PCT No.: PCT/GB89/01494
§ 371 Date: Jul. 23, 1991
§ 102(e) Date: Jul. 23, 1991
[87] PCT Pub. No.: WO90/07139
PCT Pub. Date: Jun. 28, 1990

[30] Foreign Application Priority Data
Dec. 22, 1988 [GB] United Kingdom ............... 8829872

[51] Int. Cl.⁵ .............................................. G02B 6/36
[52] U.S. Cl. .................................. 385/139; 385/81
[58] Field of Search ................ 385/67, 68, 81, 83, 385/84, 107, 113, 138, 139

[56] References Cited
U.S. PATENT DOCUMENTS

| | | | |
|---|---|---|---|
| 4,441,786 | 4/1984 | Hulin et al. | 385/139 |
| 4,447,121 | 5/1984 | Cooper et al. | 385/81 |
| 4,516,830 | 5/1985 | Guazzo | 385/138 |
| 4,738,505 | 4/1988 | Jones | 385/81 |
| 4,961,624 | 10/1990 | Savitsky et al. | 385/81 |

FOREIGN PATENT DOCUMENTS
1905182 9/1970 Fed. Rep. of Germany.
2205970 12/1988 United Kingdom.

OTHER PUBLICATIONS
"Low Cost Fiber-Optic Connector with Integral Staking" IBM Technical Disclosure Bulletin, vol. 24, No. 3, Aug. 1981 by Balliet and S. B. Greenspan—pp. 1624–1626.
"Anchor Device for Optical Submarine Cable" 56-106205—Nov. 13, 1981, vol. 5, No. 177 (P-89) (849).

Primary Examiner—John D. Lee
Assistant Examiner—John Ngo
Attorney, Agent, or Firm—Nixon & Vanderhye

[57] ABSTRACT

An optical cable is terminated onto a ferrule which is secured to the tensile element of the cable. The components of the cable are clamped in order to a tail-piece of the ferrule. This prevents relative displacement of cable elements. The termination can be standardised for different cables which can then be connected by securing the tail-pieces of their terminations in a connector tube. The joint is particularly suitable for use with submarine cables.

13 Claims, 5 Drawing Sheets

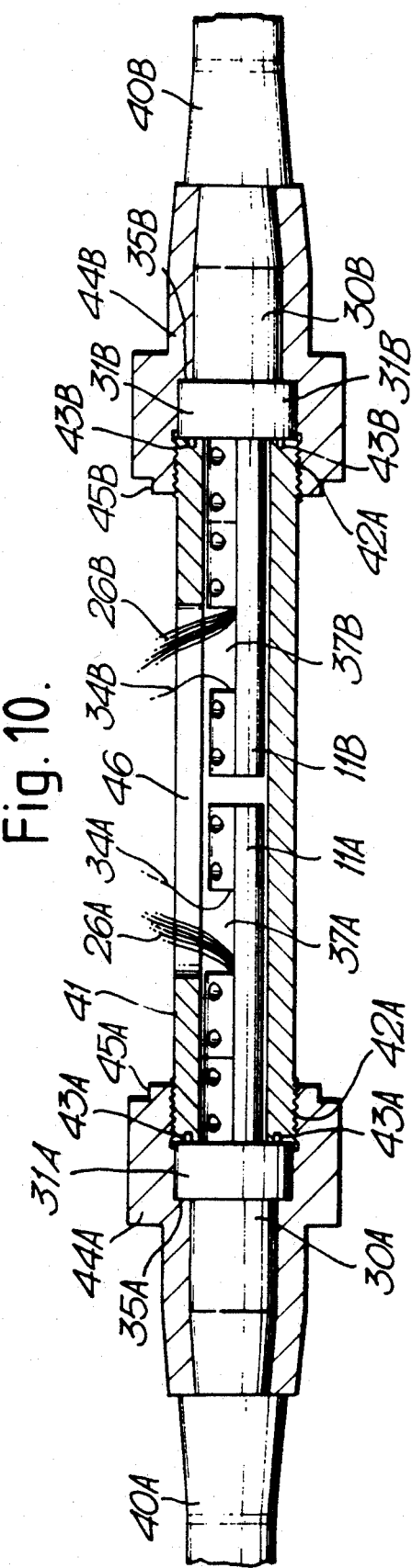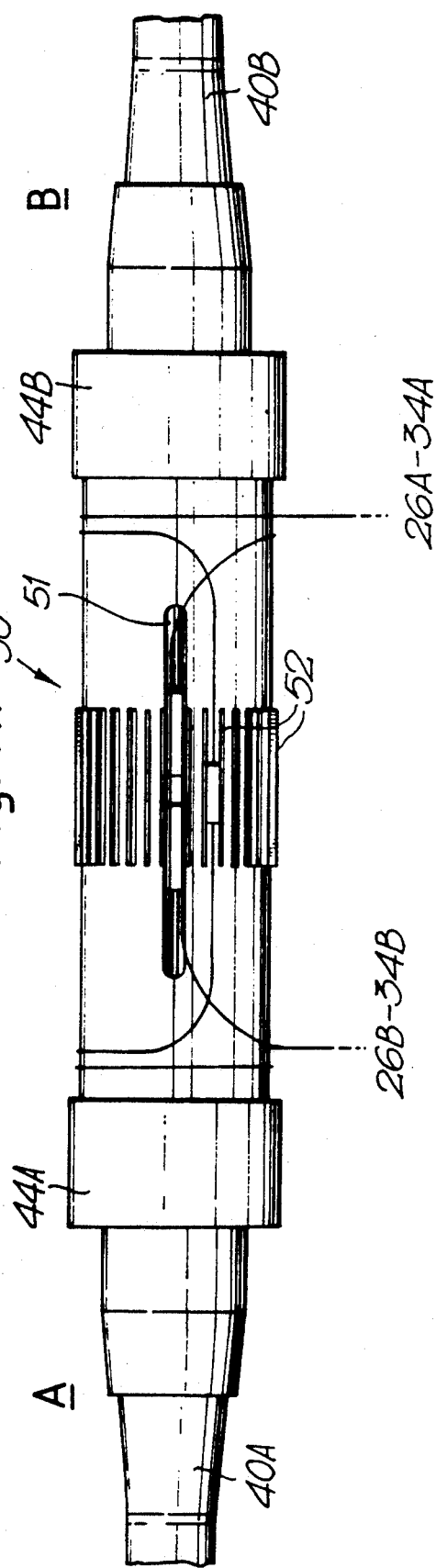

TERMINATION AND JOINT FOR OPTICAL TELECOMMUNICATIONS CABLE

FIELD OF THE INVENTION

This invention relates to a joint for optical telecommunications cables and, more specifically, to a ferrule for terminating a cable so as to facilitate jointing.

BACKGROUND OF THE INVENTION

The jointing of optical cables gives rise to many problems. The joints are complicated because each joint must connect all the systems in the cables, e.g. the optical fibres, the tensile elements, and the electrical conductors. This is particularly true of submarine cables which are designed to survive the stringent conditions imposed by a life of 25 years submerged in the sea or ocean.

It is desirable to test joints not only in commercial operations such as manufacturing cables, laying cables and repairing damaged cables but also in research. One test comprises measuring the attenuation of fibres in the joint before and after the joint is stressed with a simulated working load. Faulty jointing technique is shown by increased attenuation t the joint; in extreme instances communication is broken at the joint. In less extreme manifestations the attenuation is acceptable when the joint is first made but the lift of the joint is substantially less than the requirement. The problems of jointing are more severe when it is necessary to joint two cables with different structures.

SUMMARY OF THE INVENTION

This invention relates to a ferrule for terminating an optical cable wherein the ferrule secures all the structural elements of the cable against relative displacement. Joints are made by connecting terminated cables. Preferably the elements of the cable are terminated in sequence. In the cable the sequence is from the outside to the centre, e.g. the king wire. On the ferrule the sequence is linear but in the same order. Most suitably all cable elements, except the outer plastics sheath, are terminated to the ferrule. The invention includes:

(a) the ferrule, and especially the ferrule insert;
(b) cables terminated with the ferrule;
(c) joints comprising two terminated cables.

These are more fully defined in the claims.

We have found that good quality joints are conveniently made from cables terminated to a ferrule as described above. The loss of performance, observed after stressing, is less severe than in prior art joints.

Optical cables are designed to minimise the stresses and strains imparted to the glass fibres. Also, to reduce ingress of water in case of accidental breakage, the cables are packed with oily materials. It appears that these various circumstances create a potential for displacement of various cable elements. In a continuous run of cable there is little or no chance that the potential could become actual but there is a discontinuity at a joint. It is possible the observed loss in performance is due to movements within the joint and these movements either reduce the lift of fibres, cause higher attenuation or, at worst, break the fibres. The termination of the invention holds the fibre elements in their relative configuration, and hence degradation caused by relative movement is reduced. Furthermore it is possible to terminate different cable structures onto a standard termination so that the differences in cable structure do not affect the joints.

BRIEF DESCRIPTION OF THE DRAWINGS

Cable terminations and joints in accordance with the invention will now be described by way of example with reference to the accompanying drawings in which:

FIG. 10 shows a connection comprising two terminations (as shown in FIGS. 4–8 and/or 4 and 9) connected by means of a tubular strength member;

FIG. 11 shows the connection of FIG. 10 with a jointing bobbin for the fibre joints.

DETAILED DESCRIPTION OF THE DRAWINGS

Figure 1:
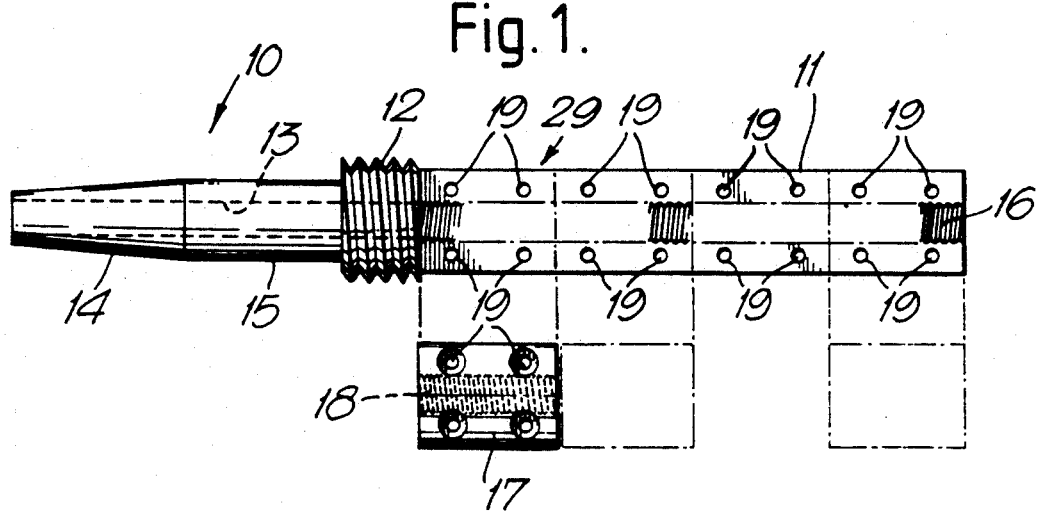
FIG. 1 shows a plan view of a ferrule insert according to the invention. A clamp member is also shown.

The ferrule insert shown in FIG. 1 is formed out of a single piece of metal. It comprises an insert portion, generally indicated by 10, and a tail-piece generally indicated by 11. A threaded collar 12 is located between them. The insert portion is circular and annular in cross section over its whole length. Its outer surface has a taper 14 at its end and a cylindrical portion 15 between the taper 14 and the threaded collar 12. A cylindrical bore 13 extends the whole length of the insert portion 10. The tail-piece 11 has a semicircular cross section with a semicylindrical groove 16 which extends along the whole length of the tail-piece 11. The diameter of groove 16 is slightly less than the diameter of bore 13 whereby elements which pass freely through the bore 13 can be gripped firmly in the groove.

FIG. 1 also shows a saddle clamp, generally indicated by 17, which is adapted to engage with the tail-piece 11. The clamp 17 has the same cross section as the tail-piece 11, it includes a groove 18 which has the same diameter as the groove 16.

Both the tail-piece 11 and the clamp 17 have bolt-holes 19 which enable the clamp 17 to be secured to the tail-piece 11. When the clamp 17 is attached, its groove 18 combines with the groove 16 to form a bore which is an extension of the bore 13. Both grooves 16 and 18 are ridged so that, when an optical cable element is gripped, its longitudinal movement is restricted.

In an alternative embodiment, not illustrated, at least part of the tail-piece 11 is removable. Preferably only a portion is removable and this portion is conveniently attached by means of a saddle-clamp, e.g. by dividing the tail-piece within the length of the clamp.

Figure 2:
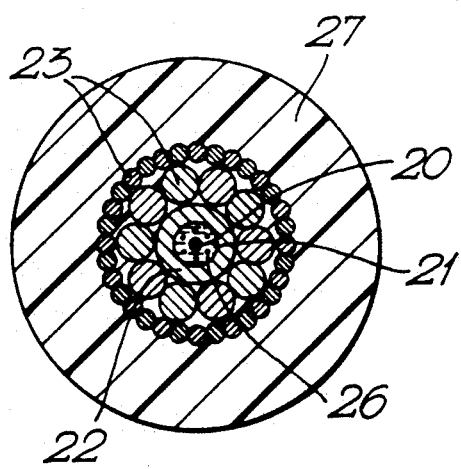
FIGS. 2 and 3 show two different cables configurations.
Figure 3:
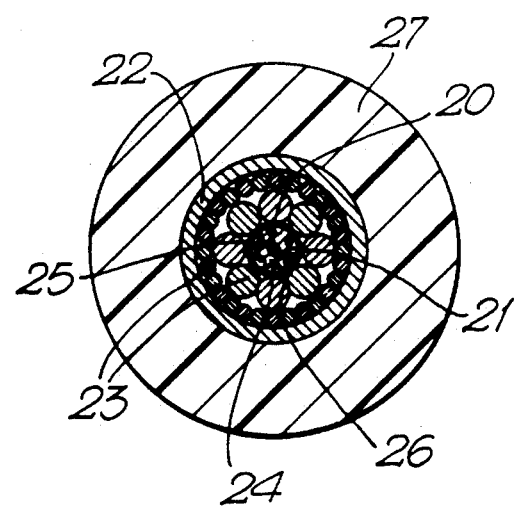

Two (different) conventional submarine optical cables are shown in FIGS. 2 and 3. Both of these cables have a substantially annular configuration, i.e. they consists of a number of concentric layers. Most, probably all, submarine cables have an annular structure.

The centre element of the cable shown in FIG. 2 is a king wire 20 (approximate diameter 1mm) surrounded by a plurality (often six) of optical fibres 26. The glass of the fibres is about 125 microns in diameter and each fibre is enclosed in its own plastics tube for abrasion resistance. The outer diameter of the plastics tube is usually about 250 microns. Usually, fibres are not visible in a real cable because they are too thin. To prevent the entry of water in case of external severance, the king wire 20 and the fibres 26 are embedded in a polymer extrusion within a viscous material which inadvertently permits movement of the fibres 26. The fibres 26, king wire 20 and embedding material constitute the communications filament 21 of the cable.

An oceanic cable includes repeaters which need electric power which must be supplied via the cable. The cable therefore includes a tubular conductor 22 (usually aluminum or copper) which surrounds the communications filament 21. Thus, in addition to its primary, electrical function the conductor 22 also helps to protect the communications filament 21.

The next component of the cable is the tensile element 23 which comprises a plurality of wires. A number of different arrangements are possible and a common arrangement provides two layers of wires, one laid clockwise the other anticlockwise, to give an anti-torsional configuration. The tensile element 23 is in contact with the conductor 22 and the tensile element also carries electric power, i.e. it assists the conductor 22. The final layer is a polyethylene sheath 27 to exclude water and provide electrical insulation.

FIG. 3 shows another form of cable in which the conductor 22 is outside the tensile element 23. This form of cable often employs a solid plastics spider 24 with grooves 25 to define helical paths for the fibre 26. Each fibre, in its own protective plastics tube, is located in its own helical groove on the circumference of the spider. The grooves are filled with viscous material to allow movement of the fibres and to provide water blocking. The spider, with all its fibres, is wound with plastics film so that no fibre can fall out of its groove. In this design of cable, the fibres 26, king wire 20, spider 24, viscous material and wrapping constitute the communications filament 21.

The optical fibres 26 provide paths for optical telecommunication signals, i.e. the telecommunications traffic. In a long (5000km) cable there are many repeaters, e.g. fifty to one hundred. It is conventional to provide telemetry to receive, at land, data from the submerged repeaters and to send, from land, control signals to the submerged repeaters.

The kin wire 20 is surrounded by dielectric materials, i.e. glass, plastics and oils and by a conductor 22. Thus a coaxial system is formed and some systems use this for the telemetry. In these systems it is necessary to preserve the continuity of the co-ax system at a joint.

Thus a joint needs to preserve the continuity of several systems. Table 1 identifies the most important of these systems.

TABLE 1

(a) Fibres for traffic;
(b) Tensile elements for transfer of strength;
(c) Conductors for electric power;
(d) Telemetry, e.g. king wires;
(e) Water exclusion and insulation, i.e. the polyethylene sheath.

In order to terminate a cable it is necessary to provide for (a)-(d); (e) is achieved after the joint is finished. The termination per se is particularly concerned with (b) and (c).

Figure 4:
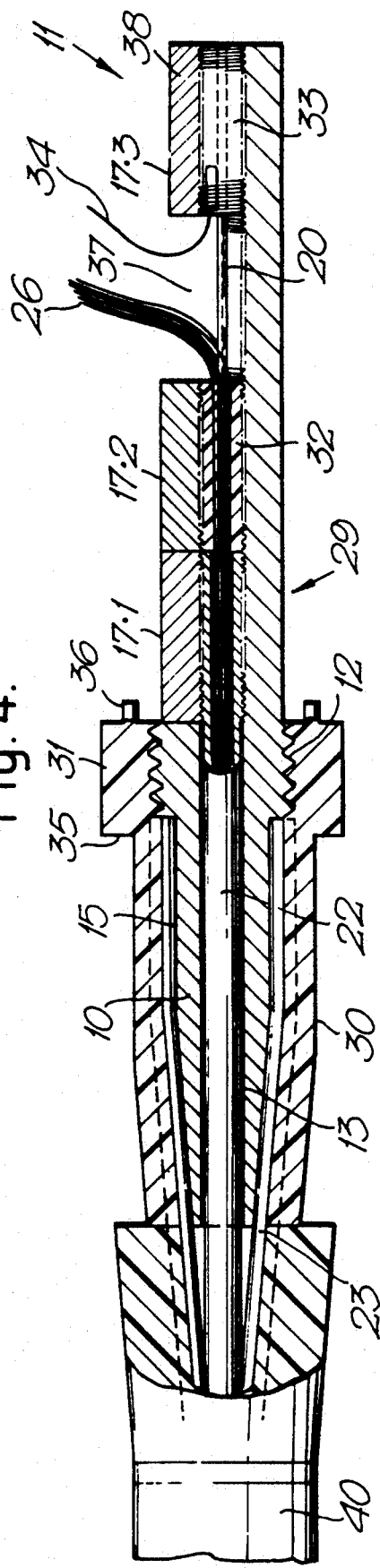
FIG. 4 shows the cable of FIG. 2 secured to a ferrule which includes the insert of FIG. 1.

FIG. 4 shows the termination of a cable as shown in FIG. 2 using a ferrule body 30 and a ferrule insert 29 as illustrated in FIG. 1. The ferrule body 30, which includes an integral flange 31 with location studs 36, is utilised to hold the termination into joints. Flange 31 has a bearing face 35 which is strong enough to carry the maximum working load of the system.

The conductor 22 and the communications filament 21 of the cable 40 are loosely located in the bore 13 of the ferrule 29 so that tensile loads are not applied to them.

Figure 5:
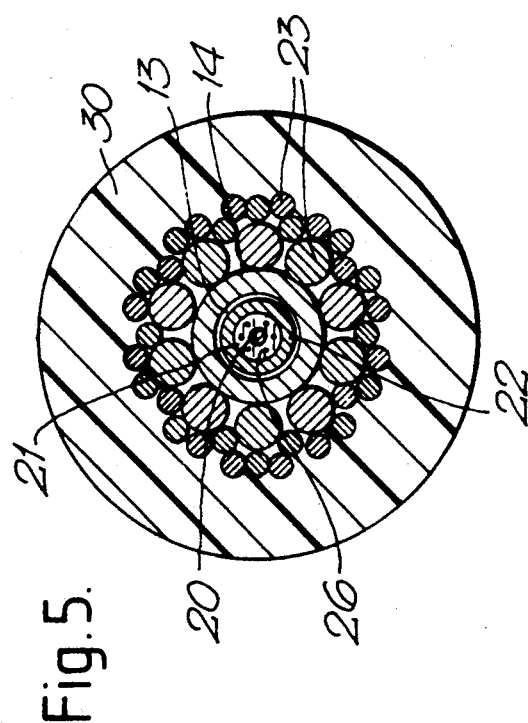
FIG. 5–8 are cross sections through FIG. 4.

The end part of the tensile element 23 is splayed out around both the taper 14 and the cylindrical portion 15, and it is gripped between these and the ferrule body 30 which is attached at the thread 12. Originally, the ferrule body 30 was cylindrical but, after location, it was subjected to high radial compression forces so that plastic, irreversible deformation occurred whereby the end part of the tensile element 23 became embedded between the ferrule insert 14 and the ferrule body 30. This is a conventional connection, usually known as "SWAGED", which grips the end part of the tensile element 23 sufficiently well that it is not withdrawn from the swaged connection by the maximum working tension of the system. In some cases abrasives, e.g. carborundum, are introduced because this increases the strength of the joint. The swaged joint, which is shown in cross section in FIG. 5, meets requirement (b) of Table 1. The ferrule insert 10 is of hardened steel and its protects the communications filament during swaging.

The termination of FIG. 4 also includes three clamps 17.1, 17.2 and 17.3 which hold the internal elements of the cable to limit axial movement.

Figure 6:
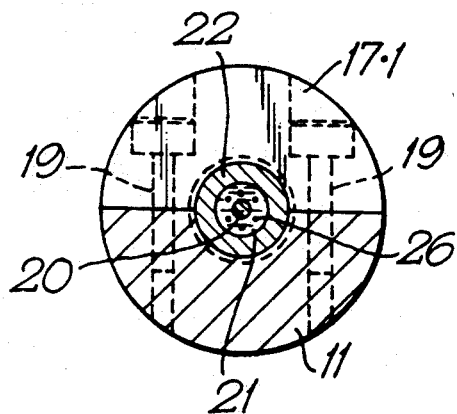

The conductor 22 extends as far as the end of the first clamp 17.1 and the configuration at this point is shown in cross section in FIG. 6. The conductors 22 is clamped between the saddle-clamp 17.1 and the tail-piece 11. This clamping holds the conductor 22 against longitudinal movement so that the relative position of cable elements is retained. It also ensures that the conductor 22 is electrically connected to the termination. The tensile elements 23 also assist as conductors and these are in electrical contact at the swaged joint shown in FIG. 5. The termination is effectively part of the conductor and requirement (c) of Table 1 is also achieved.

Figure 7:
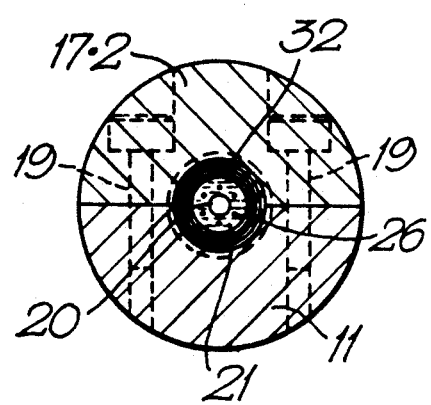

At the second clamp 17.2, as shown in cross-section in FIGS. 4 and 7, the conductor 22 has been removed leaving the filament 21 exposed. It is bulked to the same diameter as the conductor by packing 32, e.g. shrink wrap, and held against longitudinal motion by clamp 17.2 to preserve spacial relationships in the cable.

Figure 12:
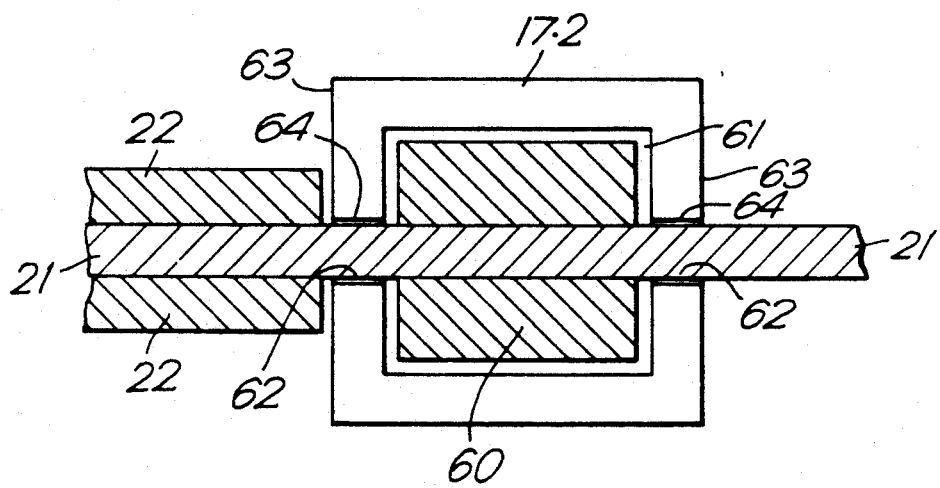
FIG. 12 shows an alternative configuration for FIG. 7.

An alternative configuration at the second clamp (17.2 in FIG. 4) is shown in longitudinal cross section in FIG. 12. In this modification the clamp takes the form of a restraining member 65. Features not shown in FIG. 12, e.g. the attachment to the tail piece 11, are as described above and illustrated in FIGS. 4 and 7.

In this modification there are short lengths 62 of exposed filament on both sides of the restraining member 65 and the packing 32 takes the form of a stopper member 60 adhered to the surface of the communications filament 21. The restraining member 65 (equivalent to the second clamp 17.2 of FIG. 4) provides a restraining chamber 61 which is slightly larger than the stopper member 60. (A section of the groove 16 being enlarged to help provide said chamber 61). The end faces 63 of the restraining member 65 have apertures 64 which are slightly larger than the communication filament 62 but substantially smaller than the stopper member 60. It can be seen that this modification applies no permanent pressure to the communications filament 21 and, therefore, no permanent pressure to the fibres contained in the communications filament 21. Nevertheless the filament cannot slide lengthwise because the stopper member 60 cannot pass through either of the apertures 64.

It should be noted that the stopper member 60 can be formed in many different ways. These include building from several layers of shrink wrap; moulding from suitable moulding compositions, e.g. cold cure rubber and epoxy resins, and applying preformed stoppers which are secured by suitable adhesives.

If desired the stopper technique can be used to restrain lengthwise movement of most forms of single and multifibre filaments. Most fibre-clamps restrain the fibre by applying long-term, e.g. the lift of a connection, radial pressure. Sometimes there are fears that this pressure may increase the attenuation and stoppers 60 held loosely in restraining chambers 61, e.g. as described above, are one way of reducing the long-term pressure.

At the end of clamp 17.2 the communications filament 21 is separated into its individual fibres, each in its own anti-abrasion tube, and the king wire 20. The support components, e.g. any spider or embedding compounds are removed. If necessary the fibres and/or the king wire are cleaned using chemical solvents. (It is convenient to hold the cable in the ferrule while this cleaning is carried out. It is also convenient to detach the tail-piece 11 if the ferrule is so constructed.) After clamp 17.2 there is a gap 37 to permit the fibre-tail to emerge.

Figure 8:
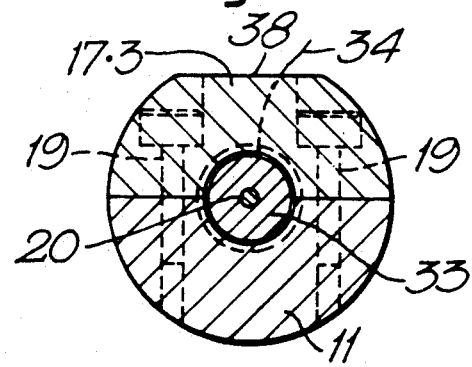

The final clamp 17.3, shown in cross section in FIG. 8, holds the king wire 20. To facilitate this the king wire 20 is soldered to a suitable terminal 33 with peripheral insulation. An insulated wire 34, about 2-3 m long, is also connected to the terminal 33. The wire 33 emerges from the gap 37 with the fibre 26. The clamp 17.3 has a flat face 38 parallel to the flat surface of tail-piece 11. This leaves a space within the diameter of the termination so that the tails of fibres 26 and the wire 34 can all be lead forward within the diameter.

In a modification, not shown in any drawing, the fibre 26 is located in a guide tube e.g. a transparent plastic tube, which is attached to the tail piece 11 in the gap 37 to prevent its accidental removal. This attachment is conveniently achieved by a lock ring which is attached to the tail piece by a bolt. The wire 34 is conveniently secured in the outer wall of guide tube, e.g. by heatshrink. The wire 34 thus provides stiffening for the guide tube.

It can be seen that this termination deals with all elements of the optical cable. Each element of the cable, except the outer sheath of polyethylene, is secured within the termination. It should be noted that the cable elements are secured in order, i.e. from the outside inwards, along the termination.

The termination as shown also provides a standard not only of configuration but also of dimensions. The standard is applicable to different cables, not only of different sizes but also of different configurations.

It is clearly desirable to design a ferrule to conform to the critical dimensions of an optical cable and to this extent each cable design needs its own tailor-made ferrule. Thus the bore 13 and grooves 16 and 18 should be sized to match the cable element, i.e. the conductor 22 in the case of the cable of FIG. 2, which fits into the bore. The size of the bore substantially defines the narrow end of the taper 14 and the angle of taper is about 3°-5° because this gives a gentle profile which assists the ease of insertion without damaging the tensile element. The outer diameter of the tail-piece is not determined by the cable and it can be standardised even for cables of different sizes. Similarly, the length of the tail-piece 11 can also be standardised. The dimensions of the flange 31 and the studs 36 are also standardised.

Figure 9:
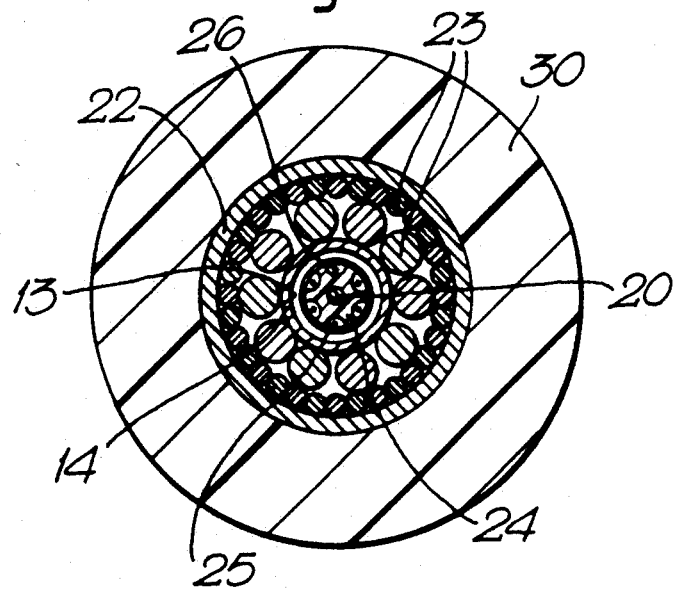
FIG. 9 corresponds to FIG. 5 but it shows the termination of a cable with the configuration shown in FIG. 3.

Not only will the termination shown in FIGS. 4-8 standardise different sizes of cable, it will also standardise different cables structures. When a cable as shown in FIG. 3 is terminated the conductor 22, being outside the tensile element 23, must enter the swaged joint as shown in FIG. 9. Thus the electrical as well as the tensile system are both terminated in the swaged joint. There is, therefore, no conductor to secure at clamp 17.1 but, in order to preserve the standard length of the tail-piece 11 clamp 17.2 is made twice as long (or a double-length clamp is used instead).

A bulkhead-nut, not shown in FIGS. 2-9, is needed to secure the ferrule into joints; this aspect is described below. In order to achieve this the internal diameter of the bulkhead-nut must be smaller than the external diameter of flange 31. Therefore, the bulkhead-nut must be placed on the cable before the ferrule is attached as described above.

FIG. 10 shows a connection between two cables 40A and 40B, each of which is terminated in accordance with the invention, i.e. as described above. Since the termination is standardised, the two cables 40A and 40B may differ either in size or configuration or in both. Parts which have been mentioned above have the same numerals; the letters "A" or "B" have been added to distinguish the two cables and their terminations.

The connection includes a tubular connector 41 which has several location holes distributed around each of its end-faces. Four of these holes appear in the cross section of FIG. 10. Two, both labeled 43A, at one end and two, labeled 43B, at the other. Screw threads 42A and 42B are provided, one at each end. The tubular connector has a slot 46 to allow fibres and wires to emerge from its bore.

The tail-pieces 11A and 11B of the two terminated cables 40A and 40B are located one at each end of the bore. The locating studs 36A and 36B engage with the location holes 43A and 43B to prevent relative rotation of the various components. Fibres 26A and 26B as well as wires 34A and 34B emerge first via the gaps 37A and 37B and second via the slot 46. The ferrules are securely held in the tubular connector 41 by bulkhead-nuts 44A and 44B which are tightened to a predetermined torque onto screw threads 42A and 42B. Shoulders 45A and 45B of the bulkhead-nuts 44A nd 44B engage with the bearing faces 35A nd 35B of the flanges 31A and 31B. This prevents unwanted relative movements of the parts and prevents withdrawal of the tail-pieces 11A and 11B from the tubular connector 41 even under the maximum working load of the system.

The connection is easily assembled from cables terminated as shown in FIG. 4. The fibre tails 26 and the wire 34 of one termination are passed through the bore of the connector 41 and out through the slot 46. The fibre tails 26 and the wire 34 are led over the flat face 38 of clamp 17.3 so that the tail-piece 11 slides easily into he bore of the connector 41. When the tail-piece 11 has been fully introduced into the bore, and the studs 36 engaged with holes 43, the bulkhead-nut 44 is screwed onto thread 42.

This sequence is repeated at the other end to complete the connection. At this stage the joint already meets requirements (b) and (c) of Table 1. Requirements (a) and (d) are met by joining fibres 26 and wires 34 outside the connector, e.g. by using a cylindrical bobbin 50 in FIG. 11, and support ledges 47A and 47B are provided on bulkhead-nuts 44A and 44B to help to hold the bobbin 50.

The bobbin 50 is conveniently provided in two halves which are secured to the arrangement shown in FIG. 10 after it has been completed. Bobbin 50 includes a slot 51, formed by the juxtaposition of its two halves. The fibres and wires emerge through the slot so that those from cable "A" cross over to end "B" and vice versa. The ends of the bobbin 50 form storage spools for the excesses of the fibre and the wires. The fibres are paired off as for conventional fusion joints protected by thermosetting plastics having a refractive index equal to that of the fibre cladding so that core-to-core joints can be directly inspected. The joints fit between locating fins 52 so that they are held securely. (Only a few fins are shown but about 40 would be provided). The two wires 34A and 34B are also connected and this connection is also located in between fins 52. When all six fibres have been joined (only one is shown in FIG. 11), the joint is complete except for water exclusion. This is achieved conventionally, i.e. a tubular steel guard is placed over the joint and fixed conventionally. A plastics tube for insulation is placed over the steel tube and, as is conventional, the ends are sealed by injection moulding which melts, and thereby merges with, the plastics jacket and the plastics sheath 27 of the cable. Injection moulding at both ends makes the sheath continuous from cable to cable over the whole of the joint. All the functions identified in Table 1 are provided. (The tubular closure elements must be placed around a cable before the joint is connected).

The termination can also be used in other configuration which are not illustrated in any drawing, e.g. at repeaters as well as passive joints. Modifications, using a domed-protector instead of a tube can be used to protect a cable. Such a protector is fitted after the end has been prepared for jointing and tested, but before the joint has been made. Domed-protectors preferably include attachment means for handling, e.g. to allow connection to winches or pulling lines. Some marine operations may involve leaving an unjointed cable end on the sea bed. In such cases a plastics seal is injection moulded over the dome. Marker buoys may be connected to the attachment means. The anchor chains of the marker buoys also facilitate recovery of the end from the sea bed.

I claim:

1. A ferrule insert for terminating a cable for optical communications, which cable comprises a communications filament including one or more optical fibres and a tensile element, wherein said ferrule insert comprises a tubular portion with an outer surface for engagement with said tensile element and a tail-piece extending from the tubular portion, said tail-piece having a groove along the longitudinal axis of the insert for engagement with the communications filament of a cable, the groove being arranged such that the filament can be held so as to restrain its axial movement.

2. A ferrule insert according to claim 1, wherein the said outer surface is tapered to facilitate its insertion under said tensile element.

3. A cable termination comprising the end of a cable and a ferrule, which ferrule includes a ferrule insert and a ferrule body, wherein:
   (a) the cable comprises a communication filament including one or more optical fibres and a tensile element;
   (b) the ferrule insert comprises a tubular portion having a bore through which the communication filament extends, said tubular portion having an outer surface located inside the end portion of at least part of the tensile element;
   (c) the ferrule body surrounds said end portion which is gripped between the ferrule insert and the ferrule body whereby the ferrule is effectively secured to the tensile element of the cable; and
   (d) the ferrule insert also includes a tail-piece extending from the tubular portion, said tail-piece including a groove into which the communication filament is secured so as to restrain the lengthwise movement of said communication filament.

4. A termination according to claim 3, wherein the communication filament is secured into the groove by a clamp which applies radial pressure to said communication filament.

5. A termination according to claim 3, wherein the communication filament is secured into the groove by means of a stopper member adhered to said communication filament, said stopper member being loosely held in a restraining chamber formed partly by said groove and partly by a restraining member, said chamber having two apertures through which the filament extends, said apertures being too small to permit passage of the stopper member.

6. A termination according to claim 3, wherein the tensile element is formed of a plurality of tensile wires.

7. A termination according to claim 3, wherein the whole of the end portion of the tensile element is gripped between the ferrule insert and the ferrule body.

8. A termination according to claim 3, wherein the outer surface of the tubular portion is tapered.

9. A termination according to claim 3, wherein the tensile element of the cable contains a tubular conductor which contains the communication filament, and also wherein said conductor and its contents extend through the bore of the tubular portion of the ferrule insert into the groove of the tail-piece where the conductor is clamped at a location between the tubular portion of the ferrule insert and the clamping location of the communication filament whereby the ferrule is electrically connected to said conductor.

10. A termination according to claim 3, wherein the cable also comprises a tubular conductor which surrounds the tensile element which surrounds the communication filament and wherein the conductor, as well as the tensile element, is gripped between the ferrule insert and the ferrule body, whereby the ferrule is electrically connected to the conductor.

11. A termination according to claim 3, wherein the cable also comprises a central king wire which extends inside the communications filament to the clamping location of the communications filament and thereafter extends by itself to the end of the tail-piece where it is clamped.

12. A joint connecting two optical cables, wherein said joint comprises a connector, a first optical cable terminated according to claim 3 and a second optical cable terminated according to any one of claims 3-11, wherein:

(i) the tail-pieces are retained in the connector to withstand the maximum working load of the system;

(ii) the two ferrules, and hence the conductors of the two cables, are electrically connected via the connector;

(iii) the fibres of the cables are jointed for optical communication; and (iv) the joint is sealed.

13. A joint according to claim 12, wherein the cables are submarine cables and the joint is sealed for underwater use.

* * * * *